(12) United States Patent
Fujimori et al.

(10) Patent No.: US 6,891,652 B2
(45) Date of Patent: May 10, 2005

(54) OPTICAL MODULATOR, OPTICAL DEVICE AND PROJECTOR

(75) Inventors: Motoyuki Fujimori, Suwa (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/834,843

(22) Filed: Apr. 30, 2004

(65) Prior Publication Data

US 2004/0201877 A1 Oct. 14, 2004

Related U.S. Application Data

(62) Division of application No. 10/459,591, filed on Jun. 12, 2003.

(30) Foreign Application Priority Data

Jun. 19, 2002 (JP) ........................................ 2002-177994
May 15, 2003 (JP) ........................................ 2003-137184

(51) Int. Cl.[7] ..................... G02F 1/03; G02F 1/1335; G02F 1/1333; G03B 21/16
(52) U.S. Cl. ...................... 359/246; 359/249; 359/259; 349/8; 349/58; 349/161; 353/52
(58) Field of Search .................................. 359/237, 248, 359/245, 246, 249, 259, 288; 349/5, 58, 161, 8, 9; 353/52, 100

(56) References Cited

U.S. PATENT DOCUMENTS 6,359,721 B1   3/2002  Fujimori ..................... 359/246

FOREIGN PATENT DOCUMENTS

| JP | 11259593 A | 9/1999 |
| JP | 2000-089364 A | 3/2000 |
| JP | 2000227766 A | 8/2000 |

Primary Examiner—Loha Ben
Assistant Examiner—Jack Dinh
(74) Attorney, Agent, or Firm—Oliff & Berridge PLC

(57) ABSTRACT

A liquid crystal panel (441) has an optical modulator body (500), an accommodating portion (511) for accommodating the optical modulator body (500), a holding frame (510) for pressing and holding the optical modulator body (500) against the accommodating portion (511), and a frame member (512C) made of heat-conductive material and interposed between the optical modulator body (500) and a fixing plate (512), the frame member (512C) being provided on an outer periphery of a first substrate (501A) of a pair of substrates (501A, 501B) disposed on the side of the fixing plate (512), the fixing plate (512) and the frame member (512C) being integrally formed.

19 Claims, 15 Drawing Sheets

US 6,891,652 B2

OPTICAL MODULATOR, OPTICAL DEVICE AND PROJECTOR

This is a Division of application Ser. No. 10/459,591 filed Jun. 12, 2003. The entire disclosure of the prior application is hereby incorporated by reference herein in its entirety.

BACKGROUND OF THE INVENTION

1. Field of the Invention

The present invention relates to an optical modulator for modulating a light beam irradiated by a light source in accordance with image information, and an optical device and a projector having the optical modulator.

2. Description of Related Art

Conventionally, a projector having a light source, an optical device for modulating a light beam irradiated by the light source in accordance with image information and a projection optical system for enlarging and projecting the light beam modulated by the optical device has been known as an optical equipment using an optical device (see Japanese Patent Laid-Open Publication No. 2000-89364).

The optical device of the projector has three optical modulators for modulating color light in accordance with image information, and a color combining optical system for combining respective light beams modulated by the optical modulators to form an optical image.

The optical modulator has an optical modulator body having a pair of substrates sealing an electrooptic material such as liquid crystal therebetween and a holding frame for accommodating and holding the optical modulator body.

The pair of substrates of the optical modulator body includes a first substrate on which a data line, a scan line, a switching element, a picture electrode etc. for applying driving voltage to the electrooptic material are formed, and a second substrate on which a common electrode, a black mask, and a color filter as necessary are formed.

The holding frame has an accommodating portion for accommodating the optical modulator body, and a fixing plate for positioning the optical modulator body inside the accommodating portion. The optical modulator body is accommodated in the holding frame with one of the substrates facing to the side of the accommodating portion of the holding frame and, subsequently, the optical modulator body is pressed by the fixing plate from the side of the other substrate.

In such optical modulator, the data line and scan line formed on the first substrate and the black mask formed on the second substrate etc. absorbs the heat generated by irradiating the light beam from the light source, thereby raising the temperature of the first and the second substrates. Accordingly, the heat of the substrates has to be released.

The substrate disposed on the accommodating portion side contacts with the accommodating portion on a large area, the heat can be efficiently released by constructing the accommodating portion with a heat-conductive material such as metal.

However, heat of the substrate located on the side of the fixing plate cannot be efficiently released, because the fixing plate is constructed by a thin plate and therefore has small heat capacity and the fixing plate only partially contacts with the substrate to press and hold the substrate.

Though it is possible to thicken the fixing plate to increase the heat capacity of the fixing plate, such arrangement inevitably increases the thickness of the optical modulator and the size of the optical device provided with the optical modulator, so that size reduction cannot be achieved. Further, since the gap against an optical element disposed on the downstream of the optical modulator such as a polarization plate is enlarged, image quality such as color evenness and contrast may be deteriorated.

SUMMARY OF THE INVENTION

An object of the present invention is to provide an optical modulator without deteriorating image quality and capable of improving heat releasing ability of the substrate, an optical device and a projector having the optical modulator.

An optical modulator according to an aspect of the present invention modulates a light beam irradiated by a light source in accordance with image information, the optical modulator including: an optical modulator body having a pair of transparent substrates between which an electrooptic material is sealed; a holding frame having an accommodating portion that accommodates the optical modulator body and a fixing plate that presses and holds the optical modulator body within the accommodating portion; and a frame member made of a heat-conductive material and provided on an outer periphery of a first substrate of the pair of substrates disposed on the side of the fixing plate, the frame member being in contact with the accommodating portion and/or the fixing plate.

The frame member may only be in contact with the accommodating portion of the holding frame or may only be in contact with the fixing plate. Alternatively, the frame member may be in contact with both of the accommodating portion and the fixing plate.

According to the above arrangement, since the frame member made of heat-conductive material is disposed on the outer periphery of the first substrate of the optical modulator, the heat of the first substrate can be efficiently transferred to the frame member. Since the frame member is in contact with the holding frame, the heat transferred to the frame member is released to the outside through the holding frame. The provision of the frame member made of heat-conductive material allows efficient heat releasing from the first substrate to the holding frame, thus enhancing heat-releasing ability of the first substrate.

Further, since excellent heat-releasing ability can be obtained by providing the frame member, there is no need for increasing the thickness of the fixing plate in order to increase the heat capacity of the fixing plate, thus avoiding deterioration of image quality.

In the optical modulator of the above aspect of the present invention, the fixing plate and the frame member may preferably be integrally formed.

The fixing plate and the frame member may be integrated after constructing separate components and bonding the components with an adhesive etc. or may be integrated by welding etc. Alternatively, the fixing plate and the frame member may be an integrated molding formed by injection molding process etc.

According to the above arrangement, since the frame member made of heat-conductive material is disposed on the outer periphery of the first substrate of the optical modulator, the heat generated on the first substrate can be efficiently transferred to the frame member. Further, since the frame member is formed integrally with the fixing plate, sufficient contact area between the frame member and the fixing plate can be secured, thus releasing the heat generated on the first substrate toward the outside through a heat conduction channel from the frame member to the fixing plate.

Accordingly, heat-releasing ability of the optical modulator body can be improved, thus lengthening the life of the optical modulator. Further, since the heat-releasing ability of the optical modulator body can be enhanced, there is no need for increasing the thickness of the fixing plate to increase the heat capacity of the fixing plate, thus avoiding deterioration of image quality.

In the optical modulator of the above aspect of the present invention, the fixing plate and the frame member may preferably be made of a heat-conductive metal or a heat-conductive resin.

The heat-conductive metal may be steel-nickel alloy such as Invar and 42Ni—Fe, magnesium alloy and aluminum alloy.

The heat-conductive resin may be a resin (polycarbonate, polyphenylene sulfide, liquid crystal resin etc.) containing carbon filler such as carbon fiber and carbon nanotube.

According to the above arrangement, since the fixing plate and the frame member are made of heat-conductive metal or heat-conductive resin having excellent heat conductivity, the heat-releasing ability of the first substrate can be further enhanced by the heat conduction channel.

In the optical modulator according to the above aspect of the present invention, the thermal conductivity of the heat-conductive metal and the heat-conductive resin may preferably be not less than 10 W/(m·K).

According to the above arrangement, the heat generated on the first substrate can be rapidly released through the heat conduction channel. Further, the material of the fixing plate and the frame member can be freely selected as long as the thermal conductivity thereof is not less than 10 W/(m·K), so that the most appropriate material can be selected in designing the optical modulator in accordance with required performance etc.

In the optical modulator according to the above aspect of the present invention, the frame member may preferably be accommodated and held in the accommodating portion together with the optical modulator body and a predetermined gap may preferably be secured between the outer circumference of the frame member and the inner circumference of the accommodating portion.

According to the above aspect of the present invention, since a predetermined gap is secured between the outer circumference of the frame member and the inner circumference of the accommodating portion, mechanical interference generated between the frame member and the accommodating portion on account of difference in thermal expansion caused by different thermal expansion rate can be prevented even when the frame member and the accommodating portion are made of different components. Accordingly, distortion generated on the optical modulator on account of the heat generated on the optical modulator body can be avoided, thus preventing deterioration in image quality on account of change in the shape of the electrooptic material sealed between the pair of substrates.

In the optical modulator according to the above aspect of the present invention, a dust-proof glass that prevents adhesion of dust on the outer surface of the substrate may preferably be closely attached on the outer surface of the first substrate, and the frame member may preferably be in contact with the dust-proof glass and/or the first substrate.

The frame member may only be in contact with one of the dust-proof glass and the first substrate, or may be in contact with both of the dust-proof glass and the first substrate.

According to the above arrangement, when the frame member is only in contact with the first substrate, since the heat of the first substrate can be directly transferred to the frame member, the heat of the first substrate can be efficiently released.

Further, when the frame member is only in contact with the dust-proof glass, the heat of the first substrate is transferred to the frame member through the dust-proof glass and is released through the heat conduction channel. Since the frame member is made of heat-conductive material, the heat can be efficiently transferred from the dust-proof glass to the frame member. Accordingly, even when the frame member is only in contact with the dust-proof glass, excellent heat-releasing ability of the first substrate can be obtained.

When the frame member is in contact with both of the dust-proof glass and the first substrate, since the heat can be transferred from both of the dust-proof glass and the first substrate to the frame member, the heat-releasing ability of the first substrate can be further enhanced.

In the optical modulator according to the above aspect of the present invention, the dust-proof glass may preferably be made of any one of materials selected from the group consisting of sapphire, quartz, crystal or fluorite.

According to the above arrangement, high thermal conductivity can be applied to the dust-proof glass made of light-transmissive material. Accordingly, the heat-releasing ability of the first substrate can be enhanced by arranging the dust-proof glass with such material.

In the optical modulator according to the above aspect of the present invention, a heat-conductive adhesive may preferably be filled in the predetermined gap and between the frame member and the dust-proof glass and/or the first substrate.

According to the above arrangement, since the heat-conductive adhesive is filled in the gap formed between the outer circumference of the frame member and the inner circumference of the accommodating portion, the adhesive assists heat transfer between the respective components, so that heat conduction channel from the frame member to the accommodating portion as well as the heat conduction channel from the frame member to the fixing plate can be secured, thus further improving heat-releasing ability of the first substrate.

Further, since the adhesive having thermal conductivity is filled between the frame member and the dust-proof glass and/or the first substrate, the adhesive assists heat transfer between the respective components, so that the heat generated on the first substrate can be further rapidly released through the heat conduction channel from the frame member to the fixing plate.

In the optical modulator according to the above aspect of the present invention, the adhesive may preferably contain a metal material.

According to the above arrangement, since the metal material thermally couples the components when the adhesive is sandwiched between the components, heat transfer between the components can be further accelerated.

In the optical modulator according to the above aspect of the present invention, a linear expansion coefficient of the fixing plate and the frame member may preferably be not more than $6*10^{-6}$/K.

According to the above arrangement, since the linear expansion coefficient of the fixing plate and the frame member becomes close to the linear expansion coefficient of the dust-proof glass and/or the first substrate, variation in dimension (expansion and contraction) of the fixing plate and the frame member and the dust-proof glass and/or the first substrate caused by heat can be made approximately equal. Accordingly, when the fixing plate and the frame member are fixed to the dust-proof glass and/or the first substrate by an adhesive, distortion generated on the optical modulator on account of change in the dimension of the respective components can be prevented, and deterioration in image quality on account of change in the shape of the electrooptic material sealed between the pair of substrates can be avoided.

In the optical modulator according to the above aspect of the present invention, the plurality of data lines arranged mutually in parallel, a plurality of scan lines arranged in a direction orthogonal with the plurality of data lines, a picture electrode, and a switching element disposed between the data and the scan lines and the picture electrode may preferably be formed on the first substrate.

Such scan lines and data lines are likely to absorb the heat generated by irradiating the light beam from the light source and the temperature of the substrate with the scan lines and the data lines formed thereon is easy to rise.

According to the above arrangement, since the fixing plate integrated with the frame member is located on the side of the first substrate, the heat generated on the optical modulator body can be efficiently released.

In the optical modulator according to the above aspect of the present invention, the first substrate may preferably be disposed on a light-irradiation side of the optical modulator body.

Since polarization plate located on the downstream of the optical modulator and prism are attached on the light irradiation side of the optical modulator body, heat-releasing ability of the light-irradiation side is inferior.

According to the above arrangement, since the fixing plate integrated with the frame member is located on the side of the first substrate located on the light-irradiation side, the heat-releasing ability can be enhanced.

An optical device according to another aspect of the present invention has: a plurality of optical modulators that modulates a plurality of color lights in accordance with image information respectively for the color lights; and a color combining optical device that combines the color lights modulated by the respective optical modulators, in which the optical modulator is the above-described optical modulator.

According to the above aspect of the present invention, since the optical device has the above-described optical modulator, the same effects and advantages as the above-described optical modulator can be obtained. In other words, an optical device causing no deterioration in image quality and having excellent heat-releasing ability from the substrate can be provided.

A projector according to still another aspect of the present invention forms an optical image by enlarging and projecting a light beam irradiated by a light source after modulating the light beam, the projector having the above-described optical modulator or the above-described optical device.

According to the above arrangement, the same effects and advantages as the above-described optical modulator and the optical device can be applied to the projector.

Further, since the projector has the optical modulator and the optical device having excellent heat-releasing ability, when a fan is used to cool the optical modulator and the optical device, the size and noise of the fan can be reduced.

Further, since the projector has the optical modulator and the optical device having excellent heat-releasing ability, the light beam from the light source can be intensified, thus increasing the brightness of the image projected on a screen.

DETAILED DESCRIPTION OF PREFERRED EMBODIMENT(S)

A first embodiment of the present invention will be descried below with reference to attached drawings.
[First Embodiment]
[1. Primary Arrangement of Projector]

Figure 1:
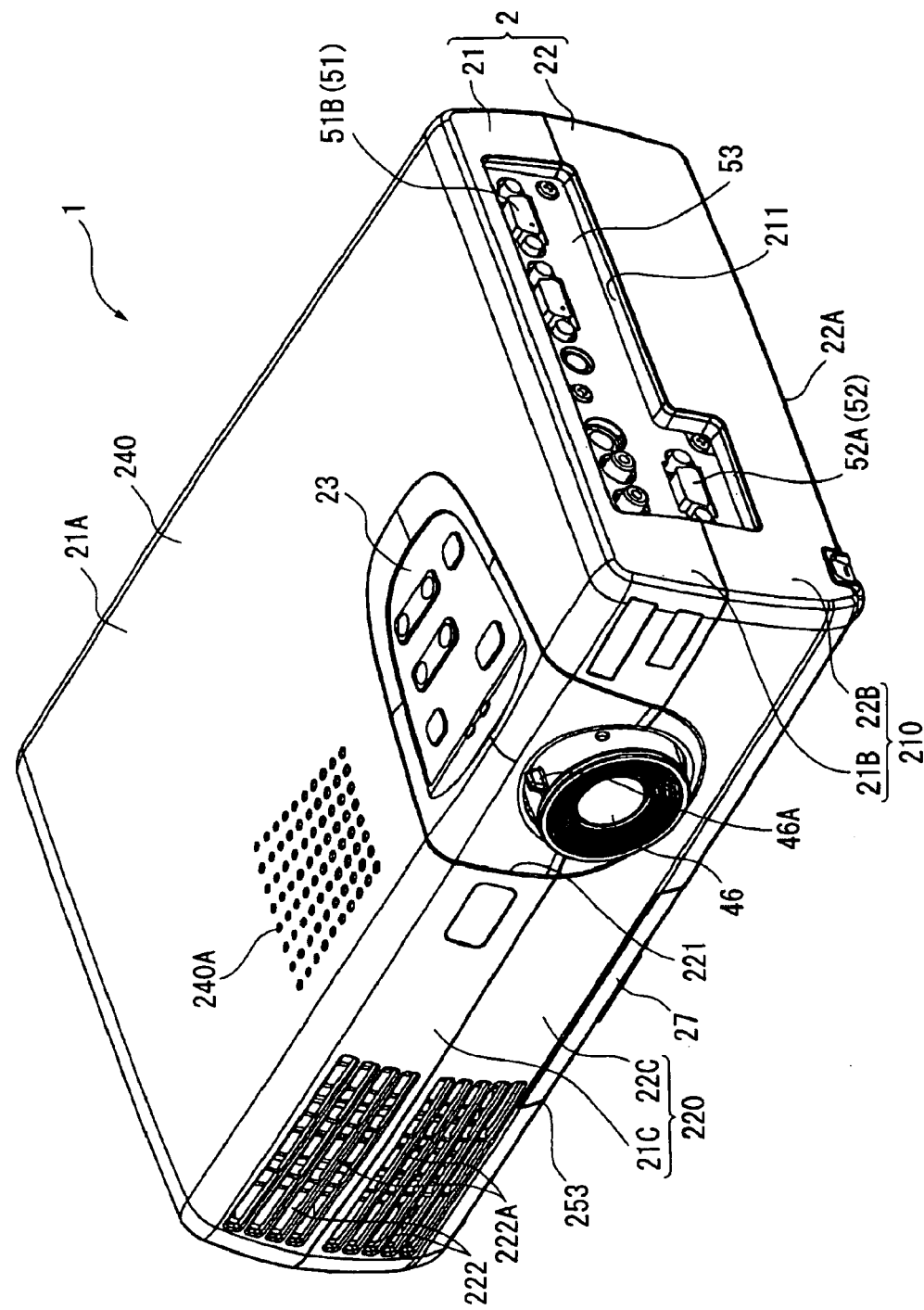
FIG. 1 is a perspective illustration showing a projector according to a first embodiment of the present invention seen from upper front side thereof.
Figure 2:
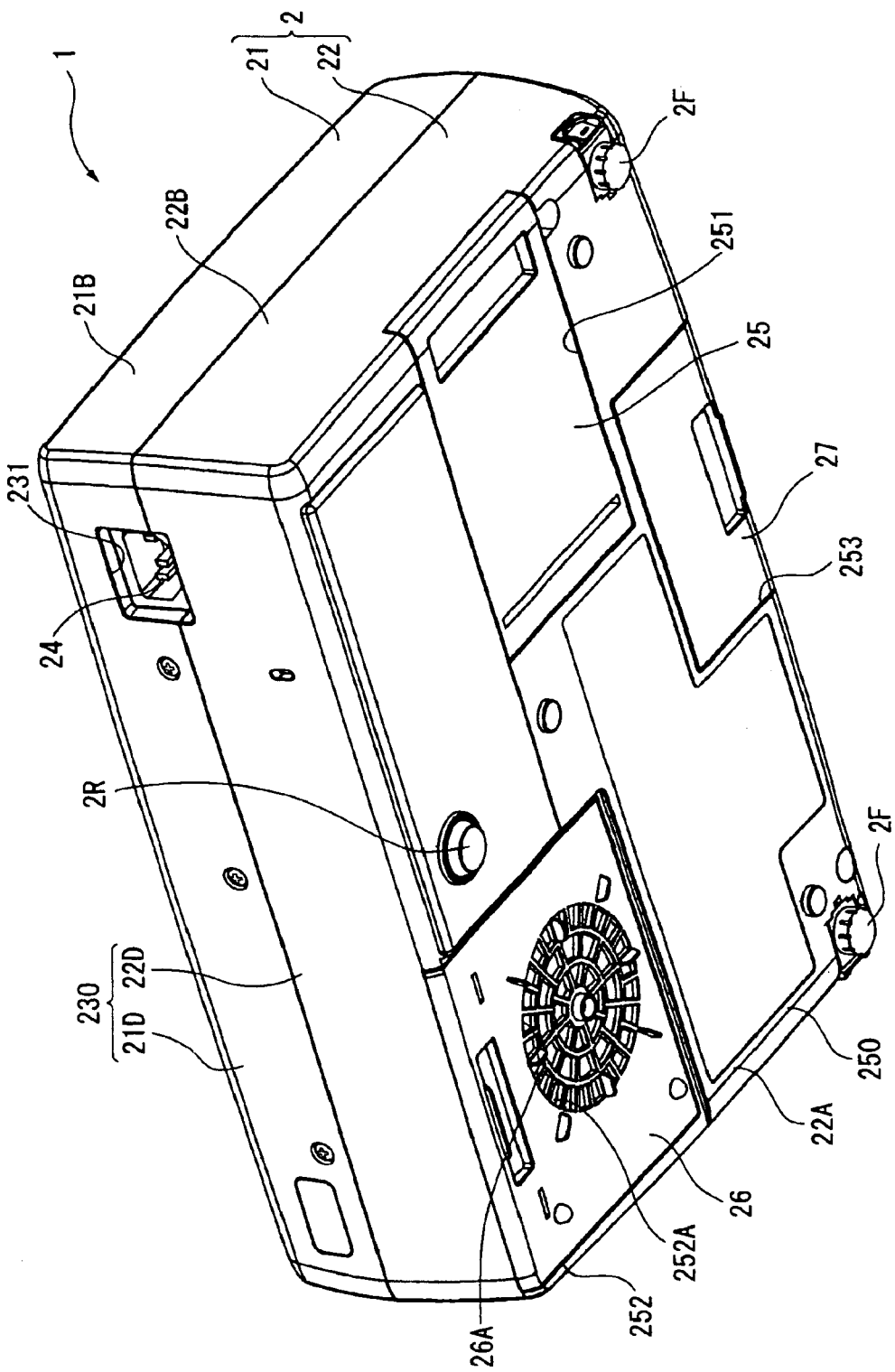
FIG. 2 is a perspective view showing the projector from lower rear side thereof.

FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2 made by injection molding. The exterior case 2 is a casing for housing a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel attached to the opening 211. Exterior electronics etc. are connected to the projector through the connectors 51B and 52A.

A circular opening 221 spanning between two front portions 21C and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F is vertically advanceable and retractable, so that the inclination (attitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is housed in the recess 253 covered by the cover 27.

Figure 3:
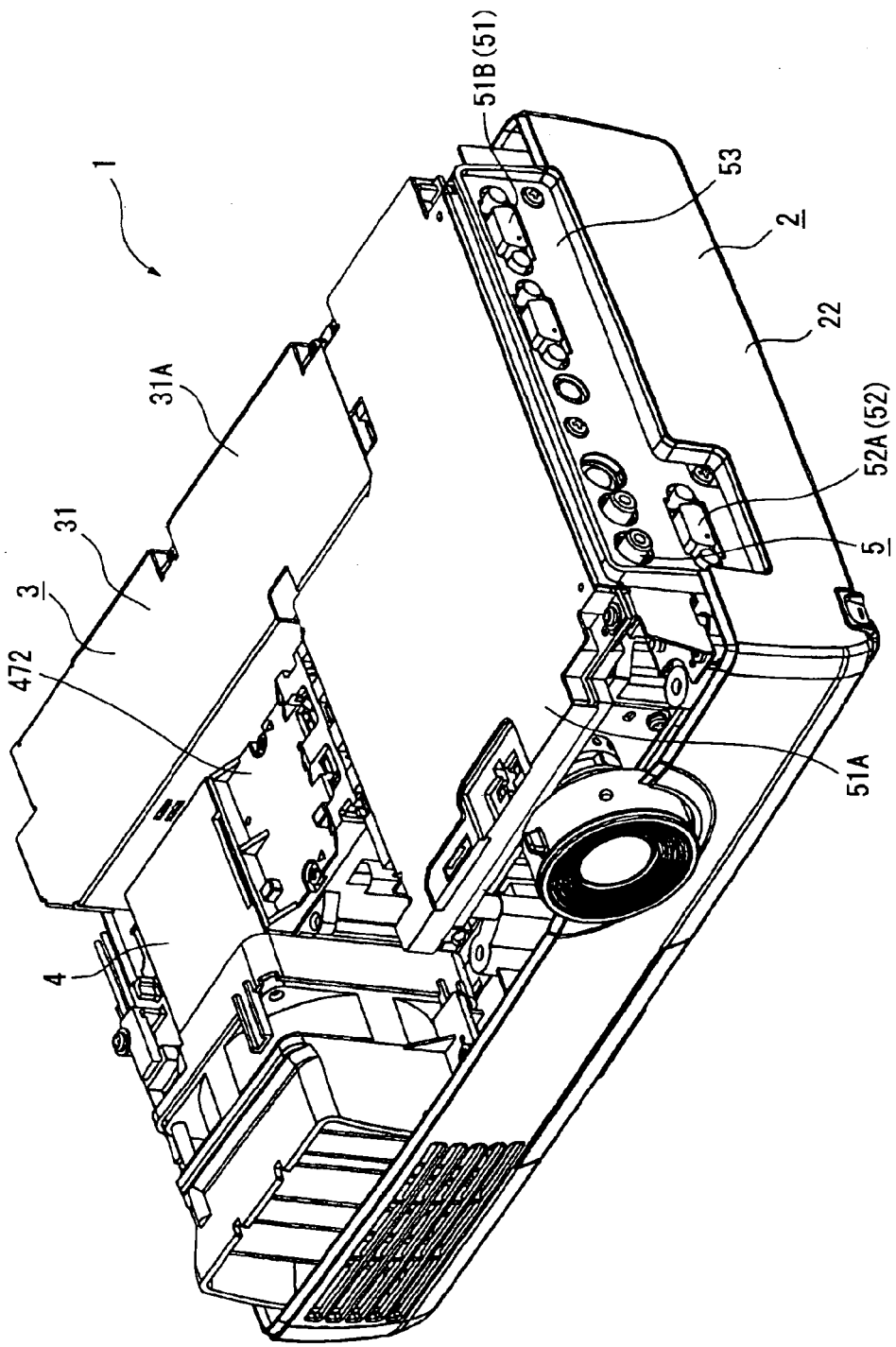
FIG. 3 is a perspective view showing the interior of the projector, which specifically shows the projector shown in FIG. 1 with an upper case being detached.
Figure 4:
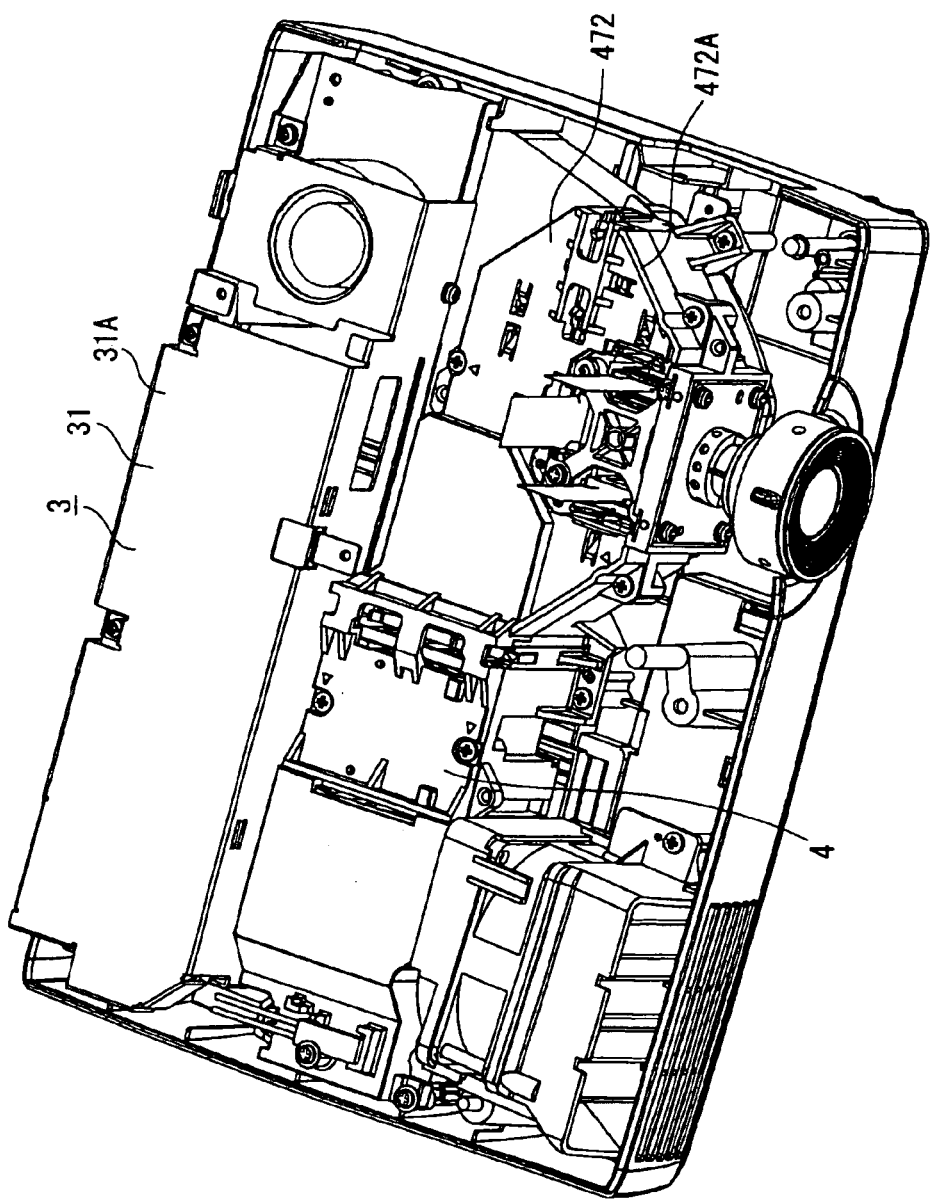
FIG. 4 is a perspective view showing the interior of the projector, which specifically shows the projector shown in FIG. 3 with a control board being detached.

FIGS. 3 and 4 are perspective view showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board 5 as a controller disposed on the upper right side of the units 3 and 4. The components 3 to 5 constitute the primary portion of the projector 1.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened.

The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel 441 of the below-described optical device in accordance with the image information inputted through the connectors 51B and 52A.

The surroundings of the main board 51 is covered with a metal shield 51A. Though not clearly shown in FIG. 3, the main board 51 abuts to an upper end 472A of an upper inner case 472 of the optical unit 4.

[2. Detailed Construction of Optical Unit]

Figure 5:
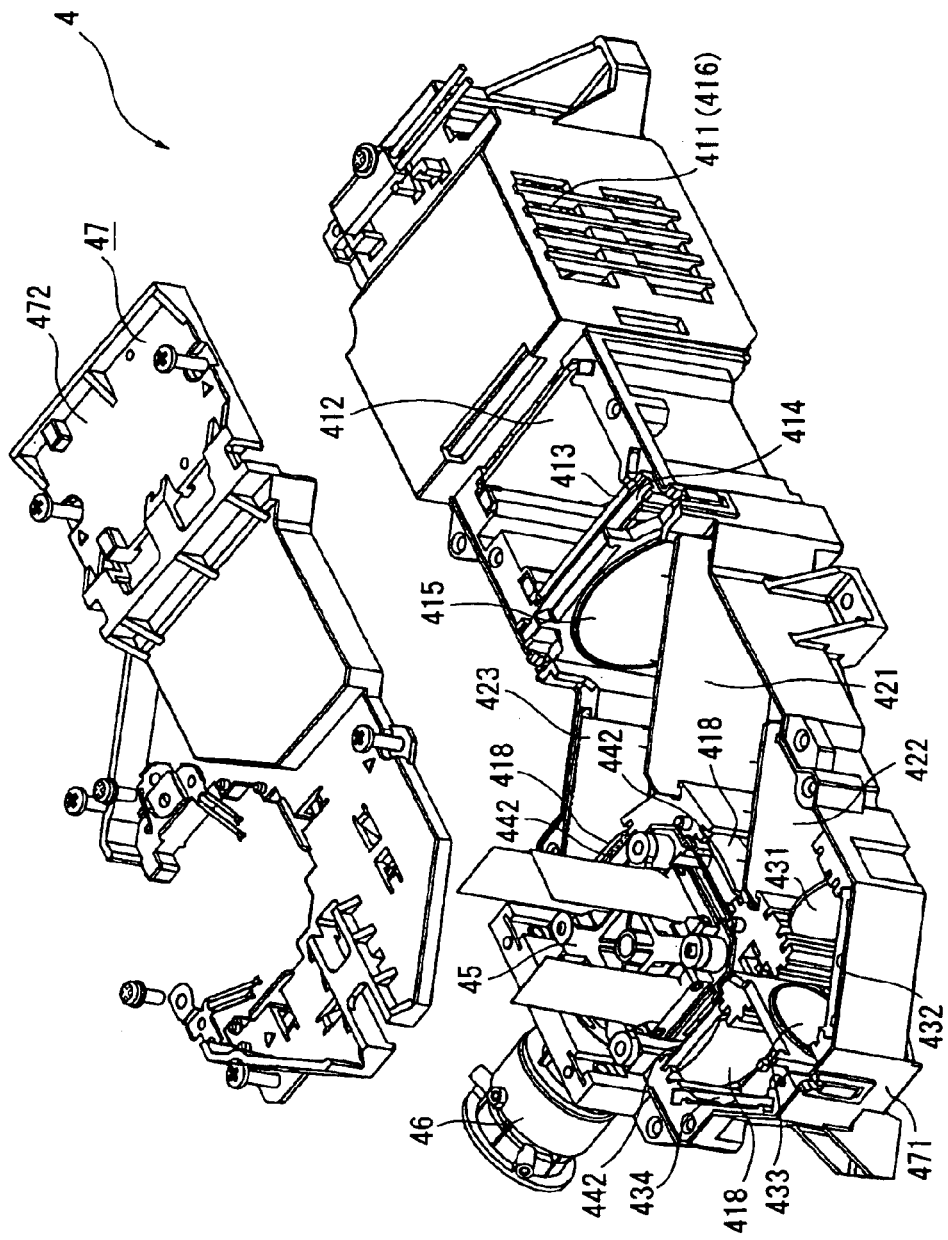
FIG. 5 is an exploded perspective view showing an optical unit of the projector.
Figure 6:
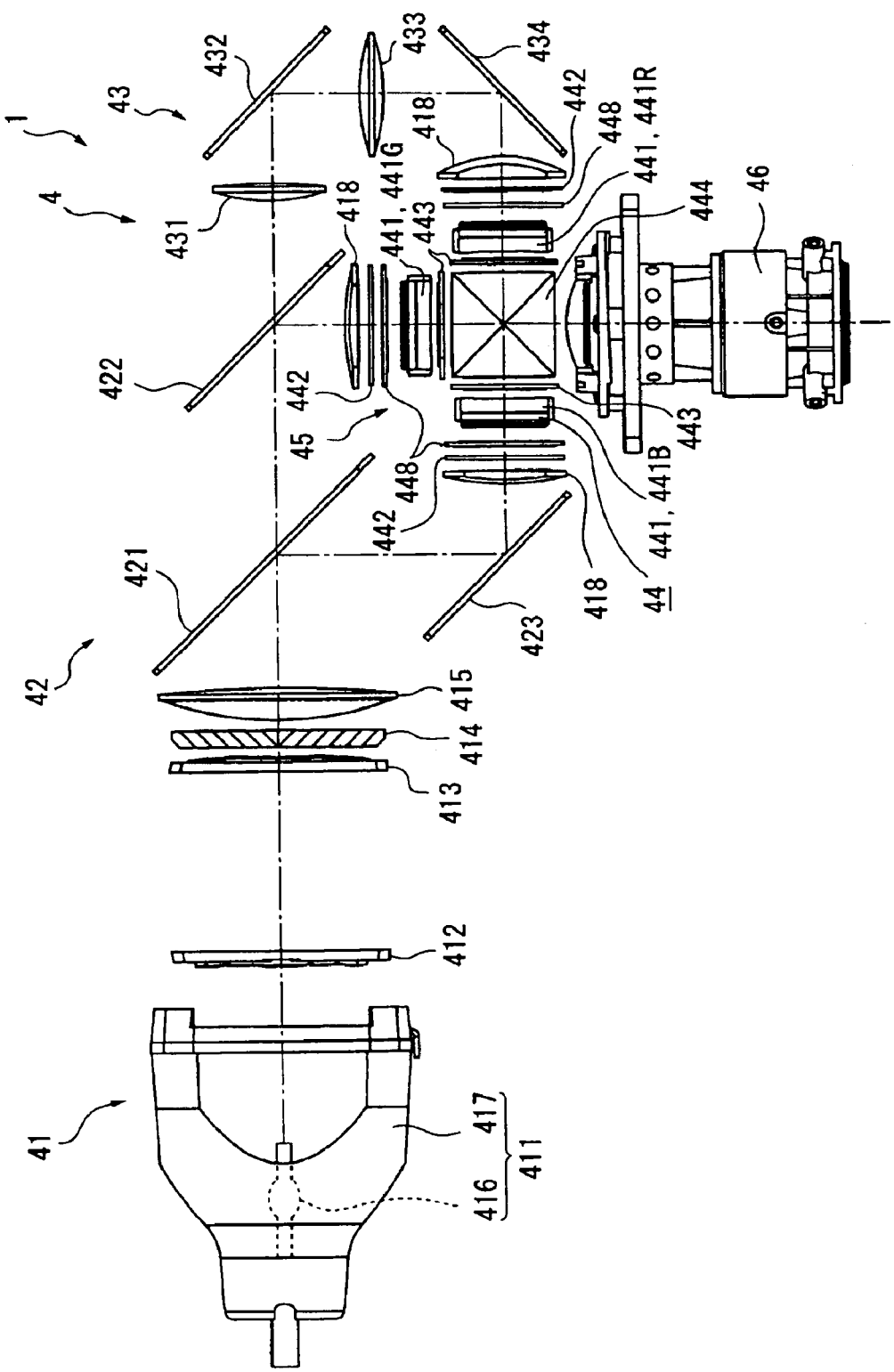
FIG. 6 is an illustration schematically showing the optical unit.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41, a color separating optical system 42, a relay optical system 43, an optical device 44, the projection lens 46 as a projection optical system, and an inner case 47 made of synthetic resin for housing the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarization converter 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 41/2*Where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415. The polarization converter 414 converts the light from the second lens array 413 to uniform polarized light in order to enhance light utilization efficiency in the optical device 44.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the integrator illuminating optical system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, a vision-angle-correcting filter plate 448 for correcting vision angle, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system. Detailed structure of the liquid crystal panel 441 (441R, 441G and 441B) will be described below.

In the optical device 44, the color lights separated by the color-separating optical system 42 are modulated by the three crystal panels 441R, 441G and 441B, the incident-side polarization plate 442, the vision-angle-correcting filter plate 448 and the irradiation-side polarization plate 443 in accordance with image information to form an optical image.

The incident-side polarization plate 442 transmits only a polarized light of a predetermined direction among the respective color lights separated by the color separating optical system and absorbs the other light beam.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The vision-angle-correcting filter plate 448 is constructed by adhering a vision-angle-correcting film for correcting vision angle on a transparent substrate such as sapphire glass.

Figure 7:
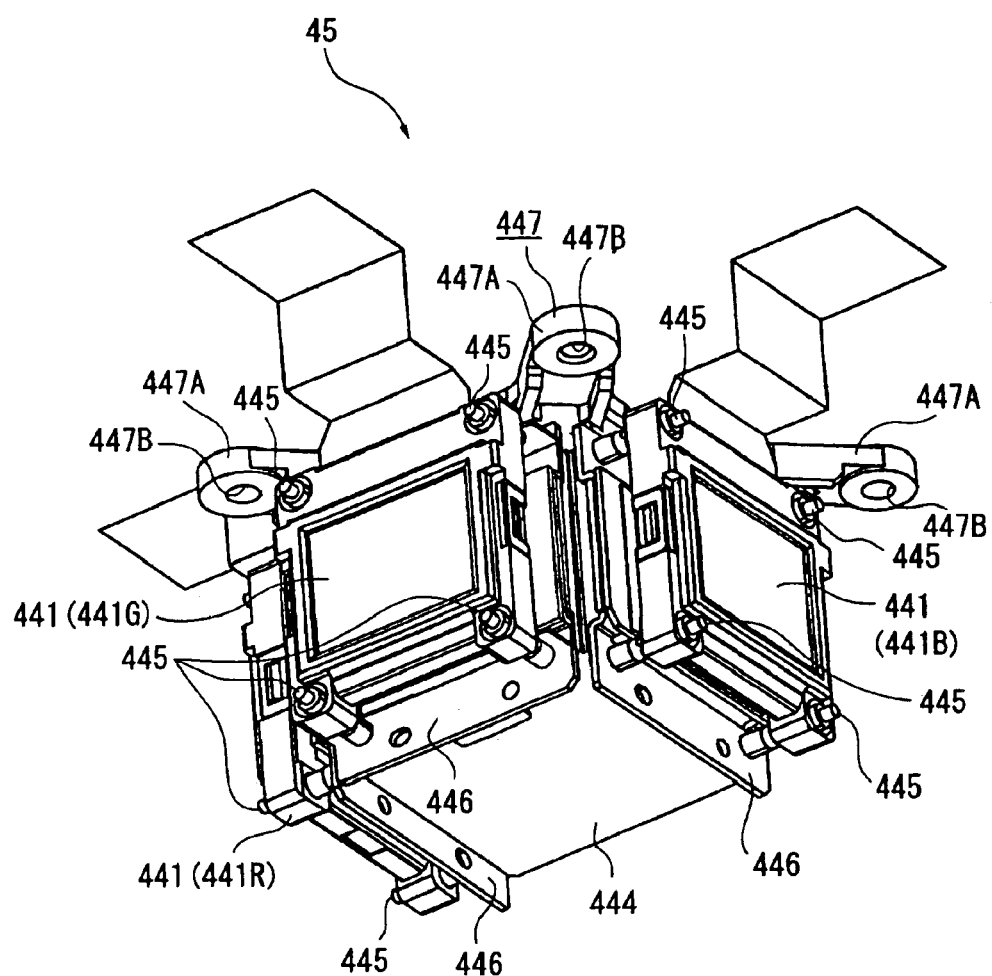
FIG. 7 is a perspective view showing an optical device body of the optical unit.

The above-described liquid crystal panels 441, the irradiation-side polarization plate 443 and the cross dichroic prism 444 are constructed as an integrated unit of optical device body 45. FIG. 7 is a perspective view showing the optical device body 45.

The optical device body 45 has the cross dichroic prism 444, a fixing member 447 made of synthetic resin and fixed on the upper side of the cross dichroic prism 444, a metal polarization plate holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the polarization plate holding plate 446.

A predetermined gap is secured between the polarization plate holding plate 446 and the liquid crystal panel 441, so that the cooling air can flow through the gap.

The optical device body 45 is screwed to the lower inner case 471 through a circular hole 447B of four arms 447A formed on the fixing member 447.

[3. Detailed Structure of Liquid Crystal Panel]

Figure 8:
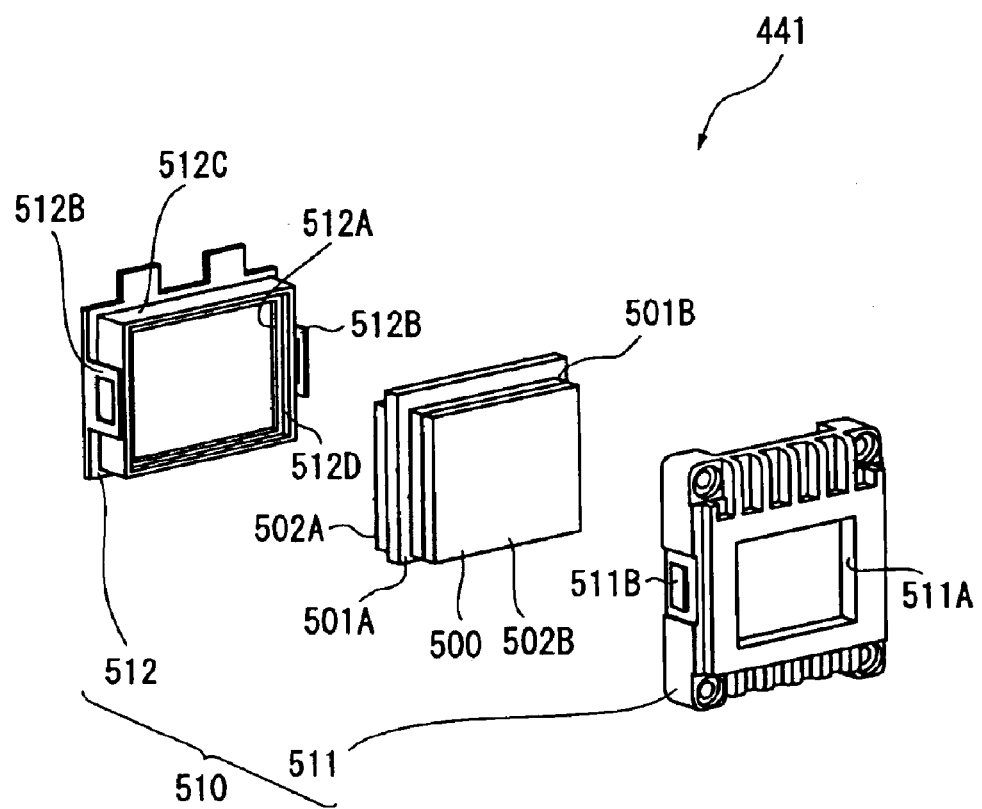
FIG. 8 is an exploded perspective view of a liquid crystal panel.

The structure of the liquid crystal panel 441 will be described below with reference to FIGS. 8 to 10. As shown in FIG. 8, the liquid crystal panel 441 has an optical modulator body 500 and a holding frame 510 for holding and fixing the optical modulator body 500.

The optical modulator body 500 has a pair of substrates 501A and 501B made of glass etc. and dust-proof glasses 502A and 502B attached on the pair of substrates 501A and 501B.

The pair of substrates 501A and 501B are attached with a predetermined space secured therebetween through a sealing member (not shown), and liquid crystal as an electrooptic material is filled between the substrates 501A and 501B.

Figure 9:
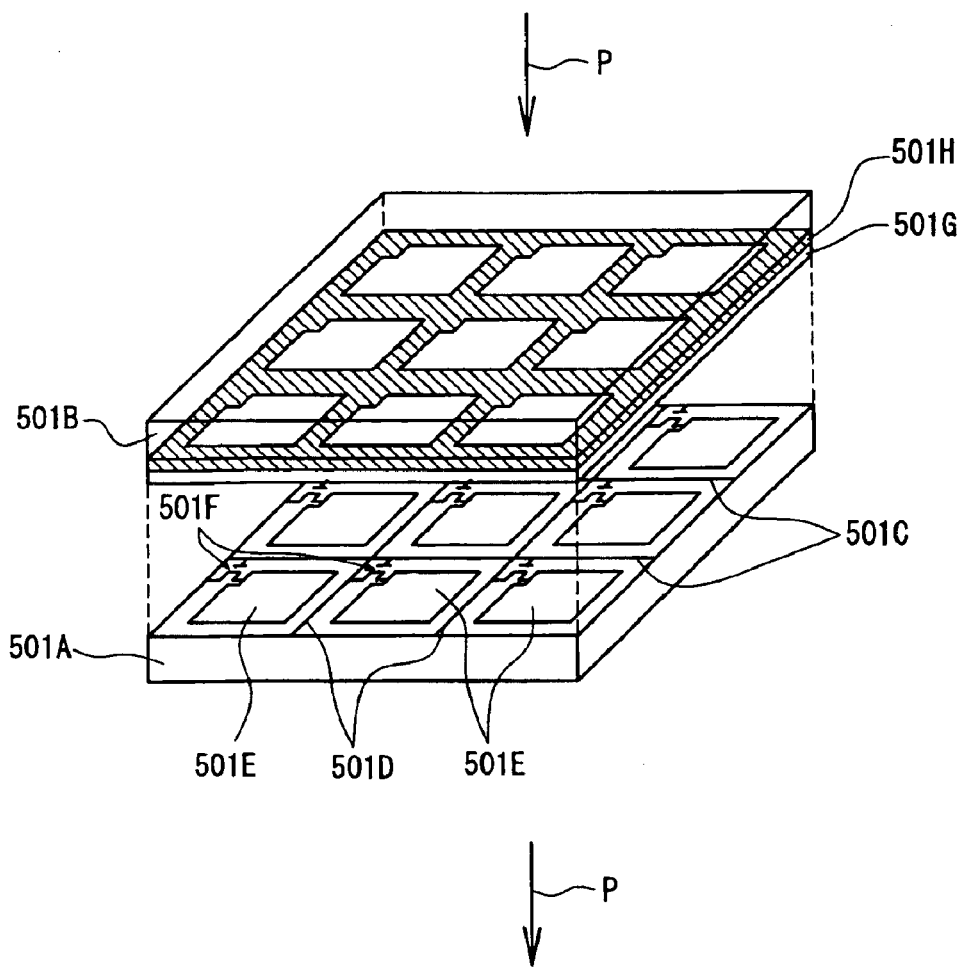
FIG. 9 is a perspective view showing a structure of a pair of substrates of the liquid crystal panel.

As shown in FIG. 9, a plurality of data lines 501C mutually aligned in parallel, a plurality of scan lines 501D arranged in a direction orthogonal with the plurality of data lines, and a switching element 501F such as a TFT element disposed between picture electrodes made of transparent conductive material such as ITO (Indium Tin Oxide) are formed on the (first) substrate 501A of the pair of substrates. An opposing electrode 501G and a black mask 501H corresponding to the picture electrode are formed on the inner surface of the other (second) substrate (501B), thereby structuring active-matrix liquid crystal panel.

The light beam is incident on the pair of substrates 501A and 501B from the side of the second substrate 501B and the light beam is irradiated from the side of the first substrate 501A.

Figure 10:
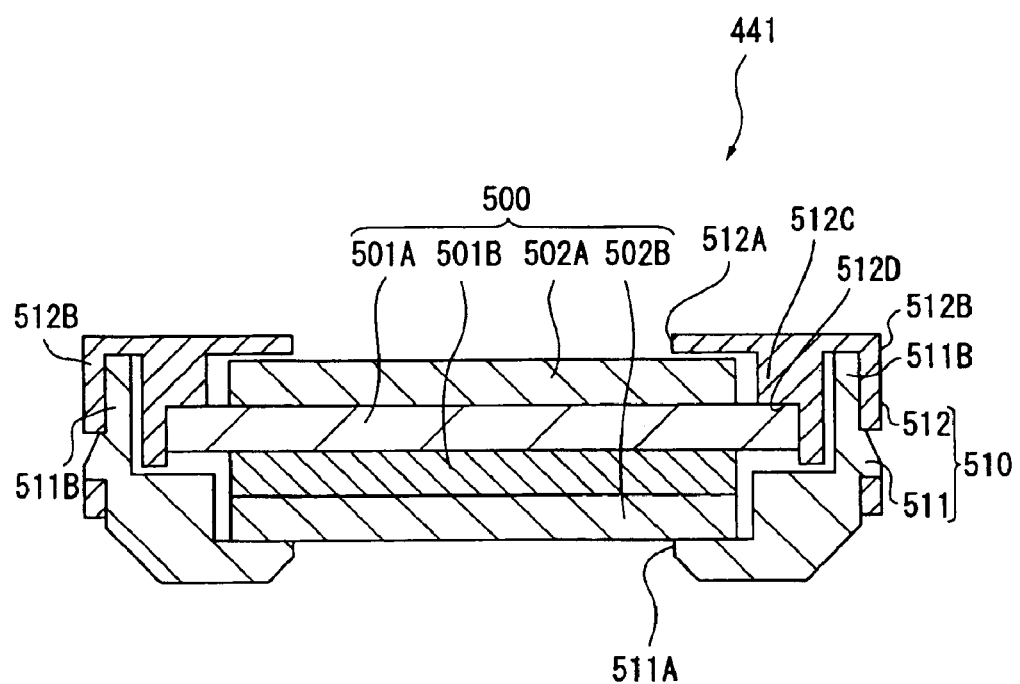
FIG. 10 is a cross section of the liquid crystal panel.

As shown in FIG. 10, the dust-proof glasses 502A and 502B are adhered on the outer surface of the pair of substrates 501A and 501B (on the light-incident and light-irradiation side). The dust-proof glasses 502A and 502B covers the outer surface of the substrate to prevent adhesion of dust on the substrate. When dust is adhered on the outer surface of the dust-proof glasses 502A and 502B, since the dust is out of focus, the dust is not displayed as a shadow on the projection image.

The dust-proof glasses 502A and 502B are constructed by, for instance, sapphire, quartz, crystal, fluorite and so on. Following Table 1 shows the characteristics (thermal conductivity, linear expansion coefficient) of the respective materials.

TABLE 1

|  | Thermal Conductivity W/m · K | Linear Expansion Coefficient * $10^{-6}$/K |
|---|---|---|
| Sapphire | 42 | 5.3 |
| Quartz | 1.2 | 0.58 |
| Crystal | 9.3 (parallel to optical axis) | 6.8 |
|  | 5.4 (perpendicular to optical axis) | 12.2 |

The outer diameter of the dust-proof glass 502A adhered on the first substrate 501A is smaller than the outer diameter of the first substrate 501A.

The dust-proof glass 502B adhered on the second substrate 501B abuts to an accommodating portion 511 of the below-described holding frame 510.

The holding frame 510 has the accommodating portion 511 for accommodating and holding the optical modulator body 500 and a fixing plate 512 for pressing the accommodated optical modulator body 500 toward the accommodating portion 511 from a light-irradiation side.

The accommodating portion 511 is an approximately rectangular frame having an opening 511A corresponding to the image formation area of the substrates 501A and 501B.

An attachment hole for the pins 445 of the polarization plate holding plate 446 to be inserted is formed on the four corners of the accommodating portion 511 (see FIG. 7). A hook stopper 511B to be engaged with the fixing plate 512 is formed approximately at the center of the lateral side of the accommodating portion 511.

Similar to the accommodating portion 511, the fixing plate 512 is an approximately rectangular frame having an opening 512A corresponding to the image formation area of the substrates 501A and 501B. A hook 512B corresponding to the hook stopper 511B is formed on the fixing plate 512. A frame member 512C projects on the light-incident side of the fixing plate 512 around the opening 512A. The fixing plate 512 and the frame member 512C may be integrated by bonding with an adhesive etc., or alternatively, may be integrated by welding etc. The fixing plate 512 and the frame member 512C may be formed as a unitary molding component formed by injection molding etc. of the same material.

The frame member 512C has an outer profile greater than the outer profile of the dust-proof glass 502A. A step portion 512D is provided on the distal end of the inner periphery of the frame member 512C so that the end of the outer circumference of the substrate 501A is fitted. The height of the step portion 512D is slightly greater than the thickness of the dust-proof glass 502A. In other words, when the optical modulator body 500 is accommodated and held in the holding frame 510, a predetermined gap is formed between the inner periphery of the frame member 512C and the outer periphery of the dust-proof glass 502A and between the light-incident side of the fixing plate 512 and the light-irradiation side of the dust-proof glass 502A, as shown in FIG. 10.

The outer periphery of the frame member 512C is smaller than the inner profile of the accommodating portion 511. In other words, when the optical modulator body 500 is accommodated and held in the holding frame 510, a predetermined gap is formed between the outer circumference of the frame member 512C and the inner circumference of the accommodating portion 511 as shown in FIG. 10.

The above-described accommodating portion 511 and the fixing plate 512 are made of metal, e.g. steel-nickel alloy such as Invar and 42Ni—Fe, magnesium alloy and aluminum alloy, or heat-conductive resin. Incidentally, the accommodating portion 511 and the fixing plate 512 may be made of the same material or different material. The fixing plate 512 and the frame member 512C may be made of the same material or different material. When the accommodating portion 511, the fixing plate 512 and the frame member 512C are made of the same material, since the dimension variation (expansion and contraction) of the respective components caused by heat becomes the same, reliability of the liquid crystal panel 441 can be greatly improved. The characteristics (thermal conductivity and linear expansion coefficient) of the respective components are shown in the Table 2 below.

TABLE 2

|  | Thermal Conductivity W/m · K | Linear Expansion Coefficient * $10^{-6}$/K |
|---|---|---|
| Invar (NI36-Fe) | 10.15 | 15 |
| 42Fe—Ni | 12.6 | 4.5 |
| Magnesium Alloy (AZ91D) | 72 | 25 |

TABLE 2-continued

| | Thermal Conductivity W/m · K | Linear Expansion Coefficient * $10^{-6}$/K |
|---|---|---|
| Aluminum Alloy (380AL) | 96 | 21.8 |
| Heat-Conductive Resin (Cool Poly D2 (tradename)) | 15 | 4 (parallel to fiber direction) 10 (perpendicular to fiber direction) |

Such liquid crystal panel 441 is assembled as follows.

Initially, an adhesive is coated on the inner circumference of the accommodating portion of the holding frame 510. Next, the optical modulator body 500 is accommodated in the accommodating portion 511 from the side of the dust-proof glass 502B. Further, the first substrate 501A is fitted to the step portion 512D of the frame member 512C of the fixing plate 512. Then, an adhesive is filled in a space formed between the inner periphery of the frame member 512C and the outer periphery of the dust-proof glass 502A, between the light-incident side of the fixing plate 512 and the light-irradiation side of the dust-proof glass 502A and between the outer circumference of the frame member 512C and the inner circumference of the accommodating portion 511. Subsequently, the hook 512B of the fixing plate 512 is engaged with the hook stopper 511B of the accommodating portion 511 to press the optical modulator body 500 to the accommodating portion 511.

A thermosetting adhesive or a photo-curing adhesive can be used as the above adhesive. The adhesive having excellent thermal conductivity may be an adhesive containing metal such as silver, silver palladium and copper or carbon.

According to the present embodiment, following advantages can be obtained.

(1) Since the frame member 512C made of heat-conductive material touching with the first substrate 501A is disposed on the outer periphery of the first substrate 501A of the liquid crystal panel 441, the heat generated on the first substrate 501A can be efficiently transmitted to the frame member 512C. Since the frame member 512C is integrated with the fixing plate 512, sufficient contact area of the frame member 512C and the fixing plate 512 can be secured, thus releasing the heat generated on the first substrate 501A to the outside through the heat conduction channel from the frame member 512C to the fixing plate 512. Accordingly, excellent heat-releasing ability of the optical modulator body 500 can be secured, thus lengthening the life of the liquid crystal panel 441. Further, there is no need for thicken the fixing plate 512 to increase the heat capacity, thereby preventing deterioration of image quality.

(2) Since the fixing plate 512 and the frame member 512C are made of heat-conductive material having especially high thermal conductivity, the heat-conductive material including heat-conductive metal such as steel-nickel alloy including Invar and 42Ni—Fe, magnesium alloy and aluminum alloy and heat-conductive resin including polycarbonate, polyphenylene sulfide and liquid crystal resin containing carbon filler such as carbon fiber and carbon nanotube, heat-releasing ability of the first substrate 501A can be further enhanced by the heat conduction channel from the frame member 512C to the fixing plate 512.

(3) When the thermal conductivity of the fixing plate 512 and the frame member 512C is more than 10 W/(m·K), the heat generated on the first substrate 501A can be rapidly released through the heat conduction channel from the frame member 512C to the fixing plate 512. Such material may be selected from various materials shown in Table 2, so that the liquid crystal panel 441 can be optimally designed.

(4) Since a predetermined gap is formed on the outer circumference of the frame member 12C and the inner circumference of the accommodating portion 511, even when the frame member 512C and the accommodating portion 511 are made of different materials, mechanical interference between the frame member 512C and the accommodating portion 511 on account of variation of dimension (expansion and contraction) caused by heat can be prevented. Accordingly, distortion on the liquid crystal panel 441 caused by the heat generated on the optical modulator body 500 can be avoided, and deterioration in image quality on account of change in the shape of the liquid crystal sealed between the pair of substrates 501A and 501B can be prevented.

(5) Since the data line 501C and the scan line 501D are formed on the first substrate 501A, which absorbs the heat generated by irradiation of the light beam from the light source, the temperature of the first substrate 501A is likely to be raised. Since the frame member 512C is in direct contact with the first substrate 501A, the heat-releasing ability of the first substrate 501A can be further enhanced.

(6) Since the dust-proof glass 502A and 502B are made of material such as sapphire, quartz, crystal, and fluorite, having high thermal conductivity, the heat-releasing ability from the first and the second substrates 501A and 501B on which the dust-proof glasses 502A and 502B are adhered can be further improved.

(7) Since a heat-conductive adhesive is filled in the gap formed between the outer circumference of the frame member 512C and the inner circumference of the accommodating portion 511, the adhesive assists heat-conductance between the respective components, so that heat conduction channel from the frame member 512C to the accommodating portion 511 as well as from the frame member 512C to the fixing plate 512 can be secured, thus further enhancing heat-releasing ability of the first substrate 501A.

(8) Since the heat-conductive adhesive is filled between the frame member 512C and the combination of the dust-proof glass 502A and the first substrate 501A, the adhesive assists heat-conductance between the respective components so that the heat generated on the first substrate 501A can be rapidly released through the heat conduction channel from the frame member 512C to the fixing plate 512.

(9) Since the adhesive filled in the gap formed between the outer circumference of the frame member 512C and the inner circumference of the accommodating portion 511 and between the frame member 512C and the combination of the dust-proof glass 502A and the first substrate 501 A contains metal such as silver, silver palladium and copper or carbon, the metal contained in the adhesive thermally couples the components sandwiching the adhesive, thereby further accelerating heat-conductance between the components.

(10) Since the linear expansion coefficient of the fixing plate 512 and the frame member 512C approximates to the linear expansion coefficient of the dust-proof glass 502A and the first substrate 501A when the linear expansion coefficient of the fixing plate 512 and the frame member 512C is not more than $6*10^{-6}$/K, dimension variation (expansion and contraction) between the fixing plate 512 and the frame member 512C and the dust-proof glass 502A and the first substrate 501A caused by the heat of the respective components can be made approximately equal. Accordingly, distortion generated on the liquid crystal pane 1441 on account of the heat generated on the optical modulator body 500 can be prevented and deterioration of image quality on account of change in the shape of the liquid crystal sealed between the pair of substrates 501A and 501B can be prevented. Such material may be selected from various materials shown in Table 2, so that the liquid crystal panel 441 can be optimally designed.

(11) Since the irradiation-side polarization plate 443 and the prism 444 are attached to the light-irradiation side of the liquid crystal panel 441, the heat cannot be efficiently released on the light-irradiation side of the liquid crystal panel 441. In the present embodiment, since the fixing plate 512 integrated with the frame member 512C is disposed on the side of the first substrate 501A disposed on the light-irradiation side of the liquid crystal panel 441, the heat-releasing ability of the light-irradiation side of the liquid crystal panel 441 can be improved.

(12) The black mask 501H is formed on the second substrate 501B and the second substrate 501B generates heat by the black mask 501H absorbing light beam, the heat being released after being transmitted to the accommodating portion 511 through the dust-proof glass 502B. In the present embodiment, since the accommodating portion 511 is made of heat-conductive material similar to the fixing plate 512 and the frame member 512C, the heat-releasing ability of the second substrate 501B can be improved.

(13) The step portion 512D is formed on the frame member 512C and the lateral side and the light irradiation side of the first substrate 501 A are in contact with the step portion 512D. Accordingly, large contact area can be secured between the frame member 512C and the first substrate 501 A, thus enhancing heat-conductance efficiency to the frame member 512C.

(14) The height of the step portion 512D is slightly greater than the thickness of the dust-proof glass 502A. Accordingly, the fixing plate 512 and the frame member 512C are not in contact with the dust-proof glass 502A, so that the dust-proof glass 502A is not likely to be damaged.

(15) Since the projector 1 has the above-described liquid crystal panel 441, the light beam from the light source 411 can be intensified, thus increasing the brightness of the image projected on the screen.

(16) Since the projector 1 has the above-described liquid crystal panel 441, when a fan is used for cooling the liquid crystal panel 441, the size of the fan can be reduced, thereby reducing the noise from the fan.

[Second Embodiment]

Next, a second embodiment of the present invention will be described below. Incidentally, the same reference numeral will be attached to the same components as in the above to omit the description thereof.

In the first embodiment, the frame member 512C of the fixing plate 512 is not in contact with the dust-proof glass 502A but is in contact with the first substrate 501A.

Figure 11:
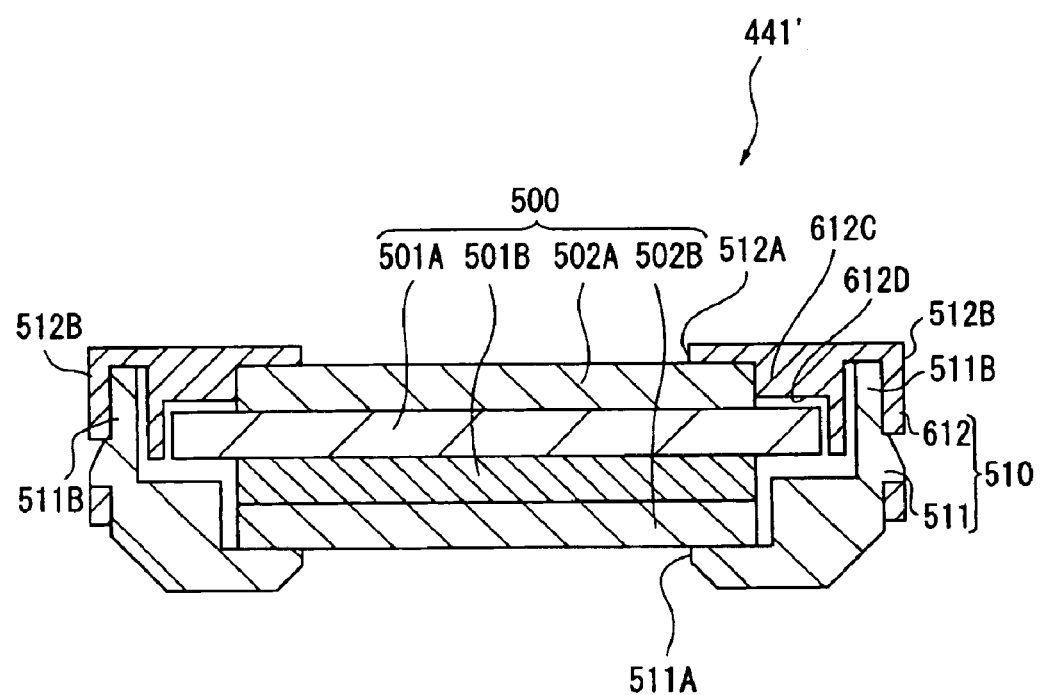
FIG. 11 is a cross section of a liquid crystal panel according to a second embodiment of the present invention.

In contrast thereto, liquid crystal panel 441' according to the second embodiment has a frame member 612C of a fixing plate 612 not in contact with the first substrate 501A but in contact with the dust-proof glass 502A as shown in FIG. 11.

The frame member 612C has approximately the same profile as the outer profile of the dust-proof glass 502A, where the dust-proof glass 502A is fitted. A step portion 612D is formed on the distal end of the inner periphery of the frame member 612C approximately in the same manner as the step portion 512D of the frame member 512C of the first embodiment, the height of the step portion 612D being slightly smaller than the thickness of the dust-proof glass 502A. In other words, as shown in FIG. 11, when the optical modulator body 500 is accommodated and held within the holding frame 510, a gap is formed between the outer circumference of the frame member 612C and the inner side of the accommodating portion 511 and also a predetermined gap is formed between the step portion 612D of the frame member 612C and the light irradiation side and lateral side of the substrate 501A. When the liquid crystal panel 441' is assembled, an adhesive having good thermal conductivity described in the first embodiment is filled in the gaps.

According to the second embodiment, following advantages as well as the advantages (2) to (4), (6) to (12), (15) and (16) of the first embodiment can be obtained.

(17) The heat transferred from the first substrate 501A to the dust-proof glass 502A is transferred to the frame member 612C, which is released to the outside though the heat conduction channel from the frame member 612C to the fixing plate 612. Accordingly, even when the frame member 612C is in contact with the dust-proof glass 502A, the heat can be efficiently released.

(18) Since the frame member 612C only abuts to the dust-proof glass 502A, the first substrate 501A is not damaged by the frame member 612C.

(19) Since the frame member 612C is in contact with the lateral side and the light irradiation side of the dust-proof glass 502A, large contact area against the dust-proof glass 502A can be secured, thus efficiently releasing the heat of the dust-proof glass 502A.

[Third Embodiment]

Next, a third embodiment of the present invention will be described below.

Figure 12:
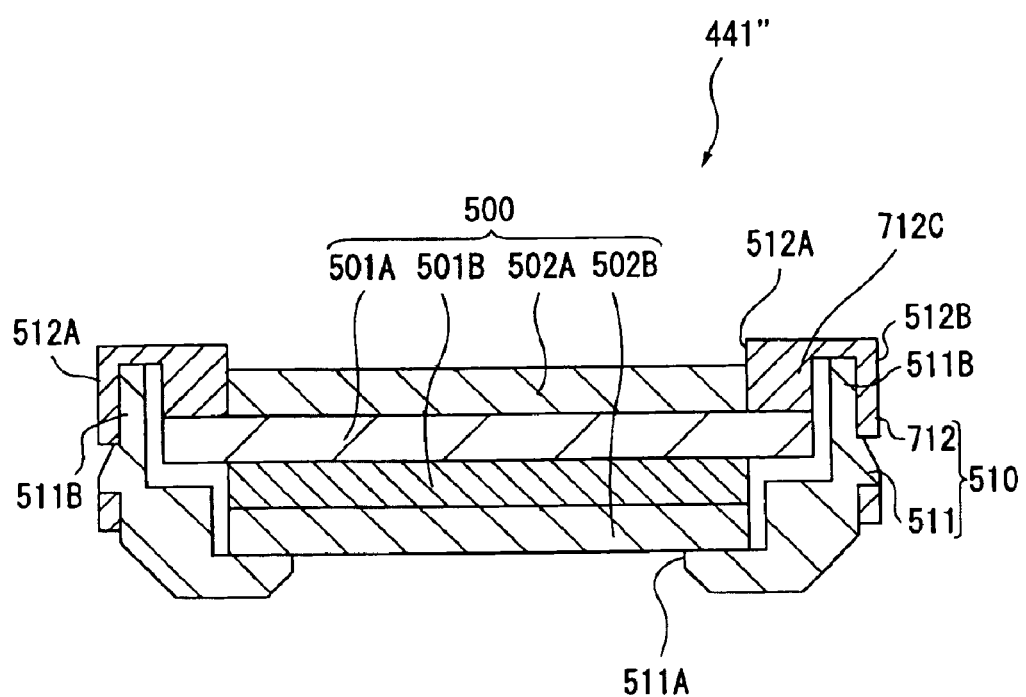
FIG. 12 is a cross section of a liquid crystal panel according to a third embodiment of the present invention.

As shown in FIG. 12, a frame member 712C of the fixing plate 712 of a liquid crystal panel 441" of the present embodiment is in contact with the first substrate 501A and the dust-proof glass 502A.

Unlike the above embodiments, the frame member 712C has no step portion. The inner periphery of the frame member 712C is in contact with the lateral side of the dust-proof glass 502A and the projecting side of the frame member 712C is in contact with the light-irradiation side of the substrate 501A.

According to the third embodiment, following advantages as well as the advantages (1) to (12), (15) and (16) of the first embodiment can be obtained.

(20) Since the frame member 712C is in contact with the first substrate 501A and the dust-proof glass 502A, the heat can be released directly from the first substrate 501A and indirectly from the dust-proof glass 502A. Accordingly, heat-releasing ability of the first substrate 501A can be further enhanced.

(21) Since there is no step portion on the frame member 712C unlike the above-described embodiments, the frame member 712C can be more easily manufactured by separately when the fixing plate 712 and the frame member 712C are separately produced.

[Fourth Embodiment]

Figure 13:
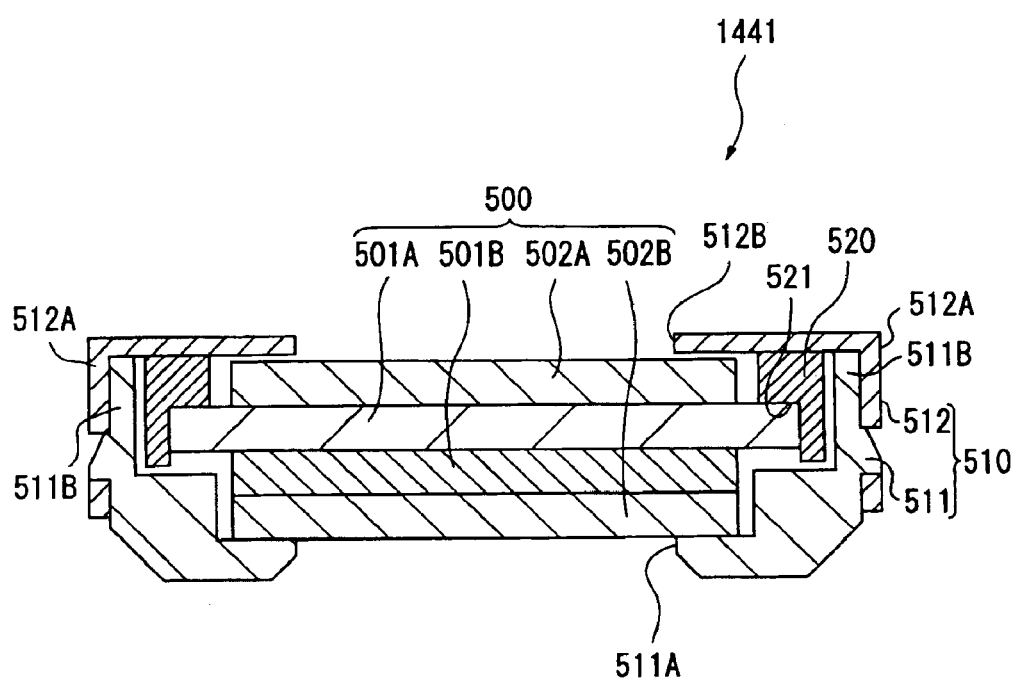
FIG. 13 is a cross section of a liquid crystal panel according to a fourth embodiment of the present invention.

Next, a fourth embodiment of the present invention will be described below. In the above-described first to the third embodiments, the fixing plate and the frame member are integrated. In contrast thereto, as shown in FIG. 13, a frame member 20 of a liquid crystal panel 1441 of the fourth embodiment is constructed as a body independent of the fixing plate 512.

The frame member 520 is made of heat-conductive material and is provided on the outer periphery of the first substrate 501A. The heat-conductive material maybe magnesium, aluminum, titanium and alloy thereof or a heat-conductive resin etc.

The frame member 520 is in contact with the fixing plate 512 of the holding frame 510. A cut 521 for the outer edge of the first substrate 501A to be fitted is formed on the inner side of the frame member 520 and the cross section of the frame member 520 is arranged in L-shape. Accordingly, the frame member 520 is in contact with the light-irradiation side and lateral side of the first substrate 501A.

The light-irradiation surface of the frame member 520 slightly projects toward the light-irradiation side relative to the light-irradiation surface of the dust-proof glass 502A.

Further, slight gap is formed between the frame member 520 and the dust-proof glass 502A and a heat-conductive adhesive is filled in the gap.

The holding frame 510 has the accommodating portion 511 for accommodating and holding the frame member 520 and the optical modulator body 500, and the fixing plate 512 for pressing the accommodated frame member 520 and the optical modulator body 500 from the light-irradiation side.

The accommodating portion 511 is made of the same heat-conductive material as the frame member 520 such as magnesium, aluminum, titanium and alloy thereof or a heat-conductive resin etc.

The fixing plate 512 is also formed in a frame shape similarly to the accommodating portion 511 and the hook 512B corresponding to the hook stopper 511B is formed on the fixing plate 512. The opening 512A corresponding to the image formation area of the substrates 501A and 501B is formed on the fixing plate 512.

The liquid crystal panel 1441 is assembled as follows.

Initially, thermosetting adhesive having excellent thermal conductivity is coated on the inner circumference of the accommodating portion 511 of the holding frame 510. Next, the optical modulator body 500 is accommodated in the accommodating portion 511 from the side of the dust-proof glass 502B. Further, the frame member 520 is attached to the first substrate 501A and heat-conductive adhesive is filled in the gap between the frame member 520 and the dust-proof glass 502A. Subsequently, the hook 512A of the fixing plate 512 is engaged with the hook stopper 511B of the accommodating portion 511 to press and fix the optical modulator body 500 to the accommodating portion 511.

According to the present embodiment, since the fixing plate 512 and the frame member 520 are constructed as independent components, positioning process required in molding a unitary component can be simplified. Further, since the fixing plate 512 and the frame member 520 are separate components, the fixing plate 512 and the frame member 520 can be exchanged as necessary.

Further, since the heat-conductive adhesive filled in the gap between the frame member 520 and the dust-proof glass 502A permeates though the space between the inner side of the accommodating portion 511 of the holding frame 510 and the frame member 520, thermal conductivity can be further enhanced.

[Fifth Embodiment]

Next, a fifth embodiment of the present invention will be described below.

Figure 14:
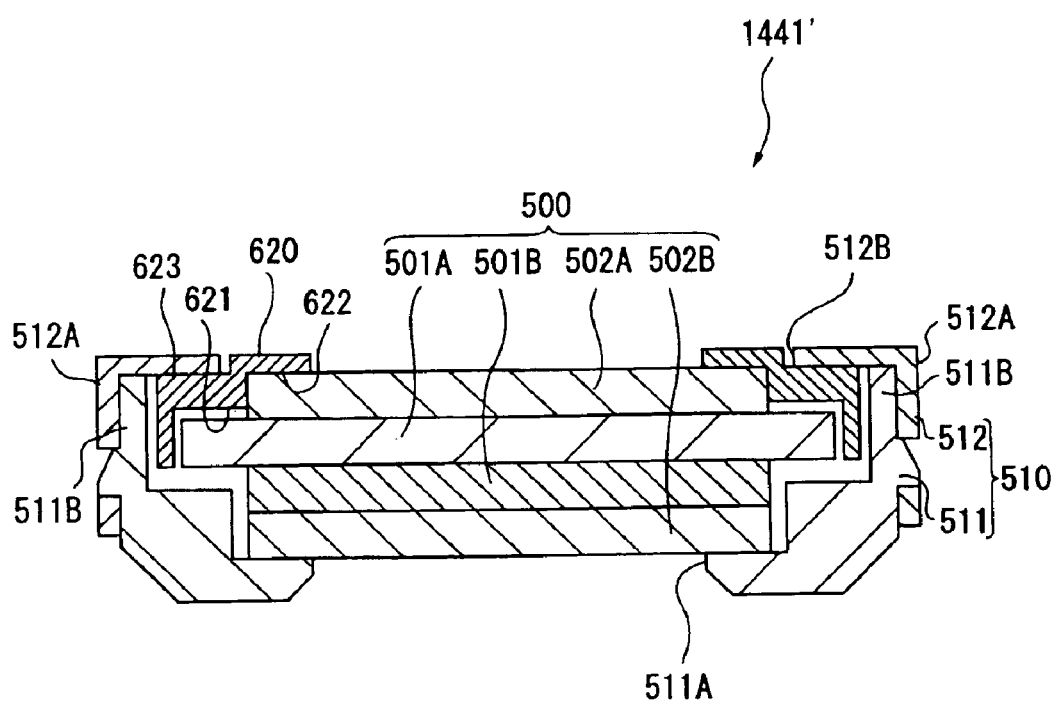
FIG. 14 is a cross section of a liquid crystal panel according to a fifth embodiment of the present invention.

In a liquid crystal panel 1441' according to the fifth embodiment of the present invention, as shown in FIG. 14, instead of the integrated fixing plate 612 and the frame member 612C of the second embodiment, a frame member 620 is constructed as a component independent of the fixing plate 512. The frame member 620 is not in contact with the first substrate 501A but is in contact with the dust-proof glass 502A.

The frame member 620 has a cut 621 for the outer edge of the first substrate 501A to be fitted and a cut 622 for the outer edge of the dust-proof glass 502A to be fitted.

The cut 622 of the frame member 620 is in contact with the dust-proof glass 502A. In other words, the frame member 620 is in contact with the light-irradiation side and the lateral side of the dust-proof glass 502A.

On the other hand, a gap is retained between the cut 621 of the frame member 620 and the first substrate 501A and heat-conductive adhesive is filled in the gap.

A step portion 623 is formed on the light-irradiation surface of the frame member 620 and the fixing plate 512 of the holding frame 510 is in contact with the step portion 623.

According to the fifth embodiment, as well as the advantages of the second embodiment, since the fixing plate 512 and the frame member 620 are made independent, positioning process required in molding a unitary component can be simplified. Further, since the fixing plate 512 and the frame member 620 are separate components,-the fixing plate 512 and the frame member 620 can be exchanged as necessary.

[Sixth Embodiment]

Next, a sixth embodiment of the present invention will be described below.

Figure 15:
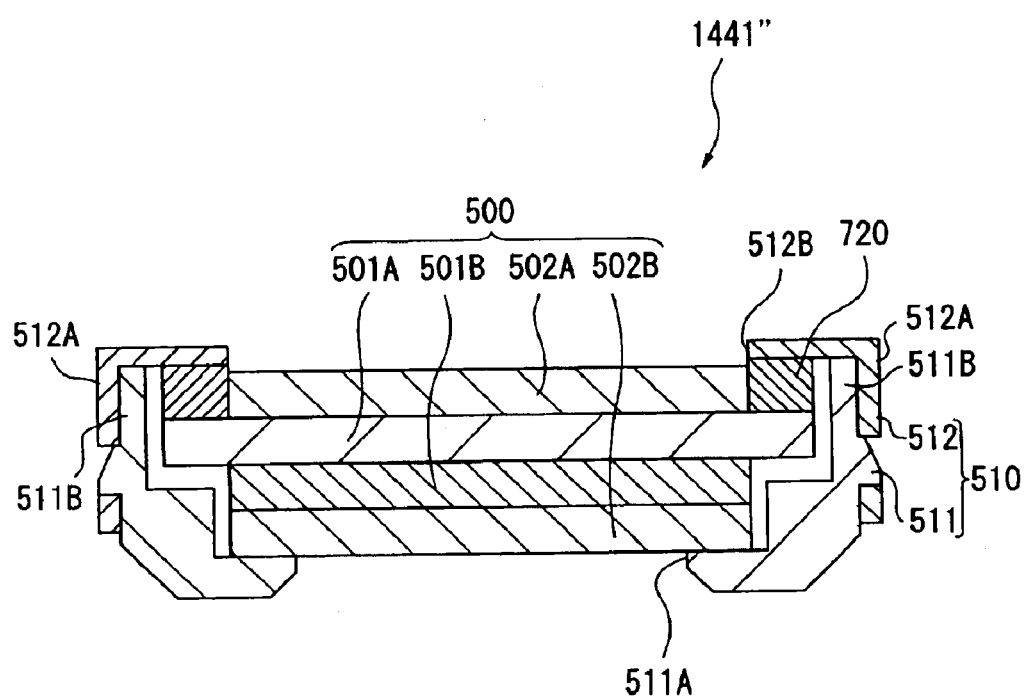
FIG. 15 is a cross section of a liquid crystal panel according to a sixth embodiment of the present invention.

As shown in FIG. 15, in a liquid crystal panel 1441' according to the fifth embodiment of the present invention, instead of the integrated fixing plate 712 and the frame member 712C of the third embodiment, a frame member 720 is constructed as a component independent of the fixing plate 512 and is in contact with the first substrate 501A and the dust-proof glass 502A.

Unlike the fourth and the fifth embodiments, there is no cut on the frame member 720. The frame member 720 is disposed at a portion on the light-irradiation surface of the first substrate 501A on which the dust-proof glass 502A is not attached.

According to the sixth embodiment, as well as the advantages of the third embodiment, since the fixing plate 512 and the frame member 720 are made independent, positioning process required in molding a unitary component can be simplified. Further, since the fixing plate 512 and the frame member 720 are separate components, the fixing plate 512 and the frame member 720 can be exchanged as necessary.

[Modifications]

Incidentally, the scope of the present invention is not restricted to the above-described embodiments, but includes modifications and improvements as long as an object of the present invention can be achieved.

For instance, though the frame members 512C, 612C and 712C integrated with the fixing plates 512, 612 and 712 of the holding frame 510 are formed along the opening 512A, such arrangement is not limiting. For instance, the frame members 512C, 612C and 712C may be integrated with a part of the periphery of the opening 512A, e.g. four corners of the periphery of the opening 512A.

Though the accommodating portion 511 of the holding frame 510 is made of heat-conductive material similar to the fixing plates 512, 612 and 712 and the frame members 512C, 612C and 712C in the above embodiments, the accommodating portion 511 may be constructed by other material such as a plastic.

Though the accommodating portion 511 of the holding frame 510 is made of heat-conductive material similar to the fixing plates 520, 620 and 720 and the frame members 512C, 612C and 712C in the above embodiments, the frame members 520, 620 and 720 may be constructed by other material such as a plastic.

Though the frame members 520, 620 and 720 are made of magnesium, aluminum, titanium and alloy thereof or heat-conductive resin etc., it is only required that the frame members 520, 620 and 720 are made of heat-conductive material, which may be other heat-conductive material such as copper. However, since magnesium, aluminum, titanium and alloy thereof or heat-conductive resin has extremely high thermal conductivity, the heat-releasing ability of the first substrate 501A can be enhanced by using magnesium, aluminum, titanium and alloy thereof or heat-conductive resin.

Though the optical modulator body 500 has the dust-proof glasses 502A and 502B in the above-described embodiments, the dust-proof glasses 502A and 502B may be omitted.

Though the frame members 520, 620 and 720 are in contact with the fixing plate 512 of the holding frame 510, the frame members 520, 620 and 720 may be in contact with the accommodating portion 511. According to such arrangement, the heat of the first substrate 501A can be released from the accommodating portion 511.

What is claimed is:

1. An optical modulator that modulates a light beam irradiated by a light source in accordance with image information, comprising:
    an optical modulator body having a pair of transparent substrates between which an electrooptic material is sealed;
    a dust-proof glass that is closely attached on an outer surface of at least one of the pair of substrates to prevent adhesion of dust on the outer surface of the one of the substrate;
    a holding frame having an accommodation portion that accommodates the optical modulator body and a fixing plate that presses and holds the optical modulator body within the accommodating portion;
    a frame member made of a heat-conductive material and provided on an outer periphery of a one of the pair of substrates disposed on the side of the fixing plate, the frame member being in contact with the accommodating portion and/or the fixing plate; and
    the outer diameter of the dust-proof glass being smaller than the outer diameter of the one of the substrate.

2. The optical modulator according to claim 1, wherein a plurality of data lines arranged mutually in parallel, a plurality of scan lines arranged in a direction orthogonal to the plurality of data lines, a picture electrode, and a switching element disposed between the data and the scan lines and the picture electrode are formed on the one of the substrates.

3. The optical modulator according to claim 1, wherein the one of the substrates is disposed on a light-irradiation side of the optical modulator body.

4. The optical modulator according to claim 1, wherein the dust-proof glass is made of any one of materials selected from the group consisting of sapphire, quartz, crystal or fluorite.

5. The optical modulator according to claim 1, wherein the frame member is provided on the side edge surface and a periphery surface of the one of the substrates.

6. The optical modulator according to claim 1, wherein the fixing plate and the frame member are integrally formed.

7. The optical modulator according to claim 1, wherein the fixing plate and the frame member are made of a heat-conductive metal or a heat-conductive resin.

8. The optical modulator according to claim 1, wherein the frame member is in contact with the dust-proof glass and/or the one of the substrates.

9. The optical modulator according to claim 1, wherein a heat-conductive adhesive is filled between the outer circumference of the frame member and the inner circumference of the accommodating portion and between the frame member and the dust-proof glass and/or the one of the substrates.

10. A projector that forms an optical image by enlarging and projecting a light beam irradiated by a light source after modulating the light beam, comprising: an optical modulator according to claim 1.

11. The projector according to claim 10, wherein a plurality of data lines arranged mutually in parallel, a plurality of scan lines arranged in a direction orthogonal to the plurality of data lines, a picture electrode, and a switching element disposed between the data and the scan lines and the picture electrode are formed on the one of the substrates.

12. The projector according to claim 10, wherein the one of the substrates is disposed on a light-irradiation side of the optical modulator body.

13. The projector according to claim 10, wherein the dust-proof glass is made of any one of materials selected from the group consisting of sapphire, quartz, crystal or fluorite.

14. The projector according to claim 10, further comprising:
    a holding frame having an accommodating portion that accommodates the optical modulator body and a fixing plate that presses and holds the optical modulator body within the accommodating portion; and
    a frame member made of a heat-conductive material and provided on an outer periphery of a one of the pair of substrates disposed on the side of the fixing plate the frame member being in contact with the fixing plate.

15. The projector according to claim 14, wherein the frame member is provided on the side edge surface and a periphery surface of the one of the substrates.

16. The projector according to claim 14, wherein the fixing plate and the frame member are integrally formed.

17. The projector according to claim 14, wherein the fixing plate and the frame member are made of a heat-conductive metal or a heat-conductive resin.

18. The projector according to claim 14, wherein the frame member is in contact with the dust-proof glass and/or the one of the substrates.

19. The projector according to claim 14, wherein a heat-conductive adhesive is filled between the outer circumference of the frame member and the inner circumference of the accommodating portion and between the frame member and the dust-proof glass and/or the one of the substrates.

* * * * *